US009645222B2

(12) United States Patent
Carey et al.

(10) Patent No.: US 9,645,222 B2
(45) Date of Patent: May 9, 2017

(54) APPARATUS FOR DIRECTION FINDING OF WIRELESS SIGNALS

(75) Inventors: Joseph M. Carey, Longmont, CO (US); Russell Brinkmann, Louisville, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 1282 days.

(21) Appl. No.: 13/570,006

(22) Filed: Aug. 8, 2012

(65) Prior Publication Data
US 2013/0038487 A1 Feb. 14, 2013

Related U.S. Application Data

(60) Provisional application No. 61/521,236, filed on Aug. 8, 2011.

(51) Int. Cl.
*G01S 3/32* (2006.01)
*G01S 3/04* (2006.01)
*G01S 3/26* (2006.01)

(52) U.S. Cl.
CPC ............... *G01S 3/325* (2013.01); *G01S 3/04* (2013.01); *G01S 3/26* (2013.01)

(58) Field of Classification Search
CPC ... G01S 3/325; G01S 3/26; G01S 3/32; G01S 3/04
See application file for complete search history.

(56) References Cited

U.S. PATENT DOCUMENTS

| 3,860,929 | A | * | 1/1975 | Crain ..................... G01S 13/44 342/149 |
| 4,346,382 | A | * | 8/1982 | Bosc ...................... G01S 7/415 342/152 |
| 5,017,929 | A | * | 5/1991 | Tsuda ................. G01S 13/4418 342/157 |
| 5,771,439 | A | | 6/1998 | Kennedy, Jr. et al. |
| 6,006,110 | A | | 12/1999 | Raleigh |
| 6,181,276 | B1 | | 1/2001 | Schlekewey et al. |
| 6,266,528 | B1 | | 7/2001 | Farzaneh |
| 6,404,386 | B1 | | 6/2002 | Proctor, Jr. et al. |

(Continued)

FOREIGN PATENT DOCUMENTS

| FR | GB 1262386 A | * 2/1972 | ........... G01S 13/449 |
| GB | 2219471 A | * 12/1989 | ............. H01Q 3/242 |

OTHER PUBLICATIONS

R.B. Dybdal, Monopulse Resolution of Interferometric Ambiguities, p. 177-183, IEEE Transactions on Aerospace and Electronics Systems, vol. AES-22(2), Mar. 1986.*

Primary Examiner — Bernarr Gregory
Assistant Examiner — Fred H Mull
(74) Attorney, Agent, or Firm — Russell T. Manning; Marsh Fischmann & Breyfogle LLP

(57) ABSTRACT

Provided herein is a compact and economical direction finding antenna using a mono-pulse antenna system, where a plurality of antenna elements are disposed in a circular array. The directional antennas may be formed by any type of antenna element, including a patch or reflector. The antenna beams of the directional antenna elements overlap, so that from any azimuthal direction, the point is covered by more than one antenna beam. Signals from each pair of adjacent antenna elements of the circular array are processed in order to determine the angle of arrival of a received signal.

7 Claims, 7 Drawing Sheets

(56) References Cited

U.S. PATENT DOCUMENTS

| | | |
|---|---|---|
| 6,509,872 B2 | 1/2003 | Ishii et al. |
| 6,571,097 B1 | 5/2003 | Takai |
| 6,920,192 B1 | 7/2005 | Laroia et al. |
| 7,324,782 B1 | 1/2008 | Rudrapatna |
| 7,340,277 B2 | 3/2008 | Nakamura |
| 7,437,159 B1 | 10/2008 | Yarkosky et al. |
| 7,522,552 B2 | 4/2009 | Fein et al. |
| 7,525,486 B2 | 4/2009 | Shtrom et al. |
| 7,528,789 B2 * | 5/2009 | Gothard ............... H01Q 1/241 343/834 |
| 7,535,410 B2 | 5/2009 | Suzuki |
| 7,609,648 B2 | 10/2009 | Hoffmann et al. |
| 7,893,882 B2 | 2/2011 | Shtrom |
| 7,916,810 B2 | 3/2011 | Tiirola et al. |
| 8,040,278 B2 | 10/2011 | Maltsev et al. |
| 8,085,206 B2 | 12/2011 | Shtrom |
| 8,217,843 B2 | 7/2012 | Shtrom et al. |
| 2002/0047800 A1 | 4/2002 | Proctor, Jr. et al. |
| 2004/0114535 A1 | 6/2004 | Hoffmann et al. |
| 2006/0148525 A1 * | 7/2006 | Moon ................ H01Q 1/246 455/562.1 |
| 2006/0267841 A1 * | 11/2006 | Lee .................... G01S 5/0081 342/463 |
| 2007/0205943 A1 | 9/2007 | Nassiri-Toussi et al. |
| 2010/0311377 A1 * | 12/2010 | Gothelf .................. G01S 3/325 455/272 |

* cited by examiner

SUM (SOLID) AND DIFFERENCE (DASHED) SIGNALS, LINEAR SCALE

APPARATUS FOR DIRECTION FINDING OF WIRELESS SIGNALS

CROSS REFERENCE TO RELATED APPLICATION

This application claims the benefit of the filing date of U.S. Provisional Application No. 61/521,236 having a filing date of Aug. 8, 2011, the entire contents of which is incorporated herein by reference.

FIELD

A method is described that can economically provide direction-of-arrival information for wireless signals.

BACKGROUND

Angle of arrival measurement is a method for determining the direction of propagation of a radio-frequency wave incident on an antenna array. Determination of angle of arrival typically involves measuring a difference of signal arrival at individual elements of the array. The measured differences (e.g., delays) allow calculating the angle of arrival.

Such antenna arrays are typically a group of identical antenna elements arranged such that signals received by each element are of different amplitudes and phases. Such antenna elements may be either directional, producing gain with respect to angle, or omnidirectional. In practice, it is difficult to obtain omnidirectional antennas in an array due to mutual coupling. There are a few different general types of antenna arrays. When the array is arranged in a straight line this is called a linear array. Antennas arranged in parallel lines on one plane has a planar array in two dimensions. Many planes in a group of arrays or antennas results in a three dimensional array.

Typically, all antenna elements in an array must be arranged in a symmetrical pattern. This symmetrical pattern, combined with appropriate electrical delay, results in the desired effect of reinforcement or cancellation of the electric field intensity. The same orientation ensures polarization in the same direction in space. Generally, this has resulted in arrays of considerable size and complexity.

One primary application for angle of arrival measurement is the geolocation of wireless devices. In such arrangements, the angle of arrival information from a single antenna array may be utilized to determine, for example, the angular location of the device relative to cell towers for sector switching purposes. Alternatively, direction information from two antenna arrays, or one array at multiple locations, may be combined to determine (e.g., triangulate) the location of the device.

SUMMARY

The presented inventions apply a mono-pulse scheme to the array antenna having the circular structure. The mono-pulse scheme estimates an incident angle of wireless signals by comparing a strength of signal indication (e.g., RSSI) of at least two sets of adjacent antennas in the circular array. Moreover, the mono-pulse scheme can estimate the direction of a target in each Pulse Repetition Interval (PRI). Consequently, the mono-pulse scheme can track the exact direction of the target which quickly changes.

Provided herein are a system, method, and apparatus (i.e., utility) that allow for determining an angle of arrival of a wireless signal utilizing simplified architecture and processing. The utility utilizes a circular antenna array having a plurality of individual antenna elements that are disposed at equal distances from the center of the array and which have equal angular spacing about the center of the array. Each of these antenna elements is operative to receive a wireless signal and generate an output indicative of that signal. The signals are received from the antenna elements are split into two identical signals. Each of these identical signals (e.g., split signals) is co-processed with one of the split signals from an adjacent antenna element. Such processing includes utilizing a summation and differencing elements for each pair of split signals to generate a summation and a difference of each of the split signals of adjacent antenna elements. A ratio of the summation and differences of the pairs of split signals from adjacent antenna elements is then generated. Based on this ratio, an angle of arrival is determined for the wireless signal.

In one arrangement, prior to generating the ratio of the summation and differences of the pairs of split signals from adjacent antenna elements, these summations and differences are sampled to generate a strength of signal indication. In one specific arrangement, the strength of signal indication is an RSSI signal. That is, a signal sampler is adapted to sample an RF signal output from the summation and differencing elements in order to generate a digital output signal. In this arrangement, a ratio of the digital signals is generated.

Determination of the angle of arrival is based on the ratio summation and difference of the pair of split signals. In one arrangement, the utility utilizes predetermined information to identify angle of arrival associated with the identified ratio. Such predetermined information includes, without limitation, lookup tables, curves and/or equations. This stored information, in any form, is specific to the configuration of the circular rate of the antenna. That is, lookup tables, curves and/or equations are specific to the configuration of a particular antenna. For instance, hexagonal arrays with six antenna elements will have different lookup tables, curves and/or equations than, for example, an octagonal array having eight antenna elements.

In one arrangement, utilization of the identified ratio with the stored information results in the generation of first and second potential angles of arrival. In such an arrangement, it may be necessary to utilize the ratio of another pair of adjacent antenna elements to confirm which of the two potential angles of arrival is the actual angle of arrival.

The utility is operative to repeatedly calculate and angles arrival of a wireless signal, for instance, on a periodic basis. In one arrangement, the utility is operative to identify an angle of arrival for each pulse repetition interval. Such an arrangement allows for identifying the angle of arrival of a wireless signal where the angle of arrival changes with the movement of, for example, a mobile wireless device. In this regard, aspects of the present utility may be utilized for identifying the location of wireless mobile device even if the wireless mobile device is moving. Further, due the simplified architecture of the utility, the utility may be incorporated into a mobile device itself. In this regard, a first mobile device may be utilized to track the location of the second mobile device. Such functionality may allow the first mobile device to navigate to the current location of the second mobile device even if that second mobile device is moving. In such an arrangement, in addition to identifying the angle of arrival of the second mobile device, the utility may further provide an estimated distance between the first mobile device and second mobile device based on, for instance, the signal strength of the signal received from the second wireless device. Such a utility has numerous applications in law enforcement and certain rescue operations.

DETAILED DESCRIPTION

The presented inventions are based in part on the realization that a compact and economical direction finding antenna can be produced where a mono-pulse antenna system utilizes a plurality of antenna elements in a circular array. In this regard, the antenna elements are equally spaced from a center point of the circular array and have equal angular spacing about the circumference of the circular array. The antenna elements of such a circular array antenna may be arranged in a pattern of a regular convex polygon where an antenna element is disposed at each vertex of the polygon. For example, an array having six equally spaced antenna elements would define a regular hexagon. However it will be appreciated that other numbers of elements are possible and are considered within the scope of the present invention. Thus, such arrays may define octagonal arrays. Further square and/or triangular arrays could also be used in the extreme cases. The directional antennas may be formed by any type of antenna element, including a patch or reflector. The antenna beams of the directional antenna elements overlap, so that from any azimuthal direction, the point is covered by more than one antenna beam.

Figure 1:
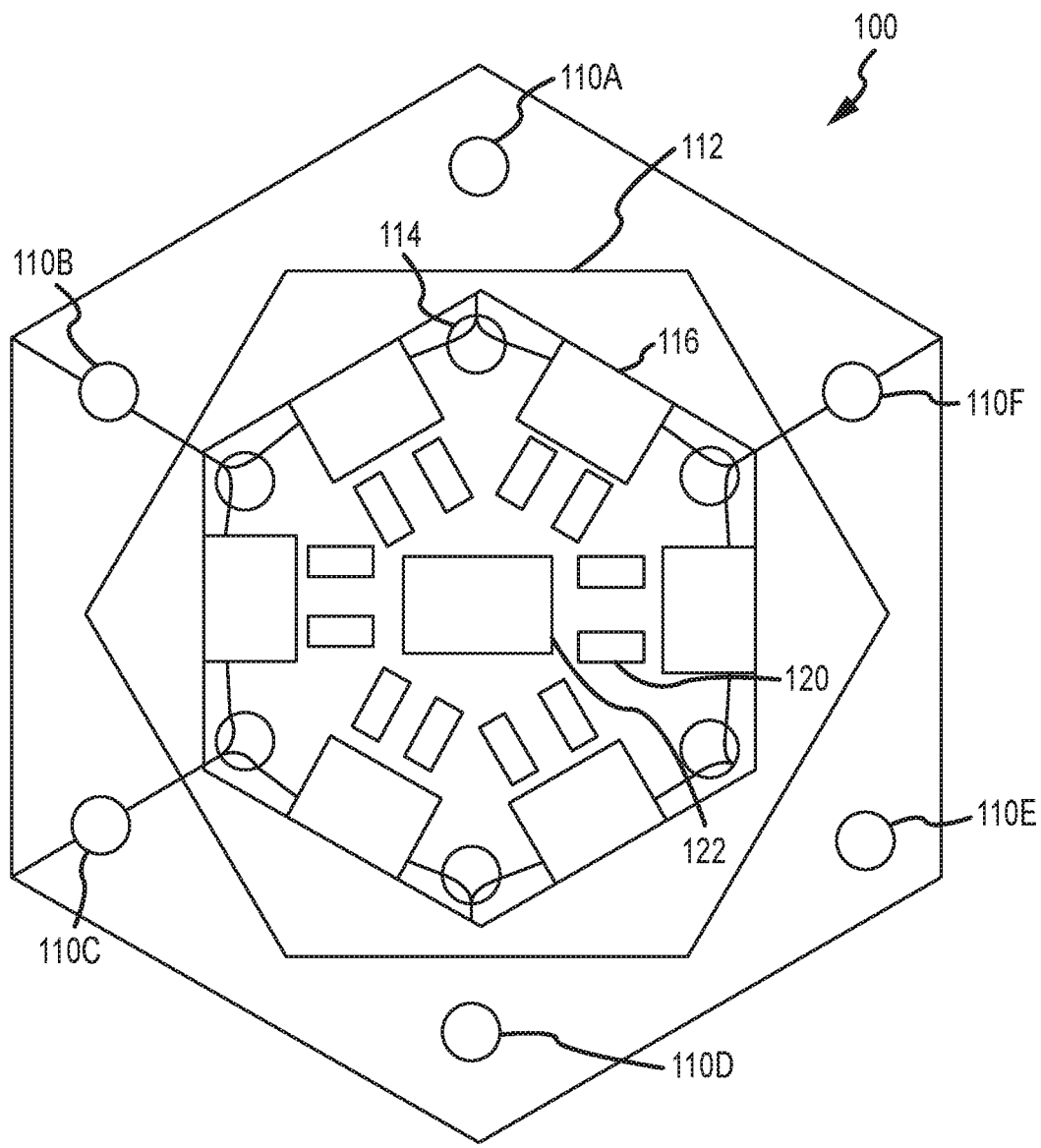
FIG. 1 illustrates one embodiment of a circular array antenna.

In the circular array arrangement, signals from each pair of adjacent antenna elements are processed in order to determine the angle of arrival of a received signal. FIG. 1 illustrates an overview of the circular array directional antenna 100. In the illustrated embodiment, the circular array antenna 100 is defined by six antenna elements 110A-F disposed at a common radius and with equal angular spacing about the antenna 100. In the illustrated embodiment, each of these antennas is formed of a monopole antenna element disposed in front of a reflector 112. The signals received from each antenna element 110A-F (hereafter 110 unless specifically identified) is fed into an analog/RF signal processing stage. Initially, each antenna signal is split evenly by a splitter 114. Such even splitting of the signals received from each antenna element is important for the overall configuration of the system. In this regard, and as will be more fully discussed herein, the signals of each pair of adjacent antenna elements are processed together for direction finding. Accordingly, in a circular array this requires splitting the signal into two even components for combination with the signals from the two adjacent antenna elements. For instance, the signal from antenna element 110A is split by splitter 114A for subsequent processing with the split signals from antenna element 110B and processing with the split signal from the antenna element 110F.

In the illustrated embodiment, the signals of adjacent antenna elements are received by a branch line coupler 116 which performs sum and difference functions on the signals after which they are received by signal samplers 120. The signal samplers may be represented by any device that reports a signal strength. In this regard, cellular phones, Wi-Fi cards, zigbee, Bluetooth radios or software defined radios may be utilized. What is important is that the sampler is operative to receive an RF signal and generate a signal strength indication such as a digital received signal strength indication (RSSI). The antenna processor 122 is operative to perform all functionality related to the sum and difference calculations as well as determination of angle of arrival from the signals received from the antennas.

Figure 2:
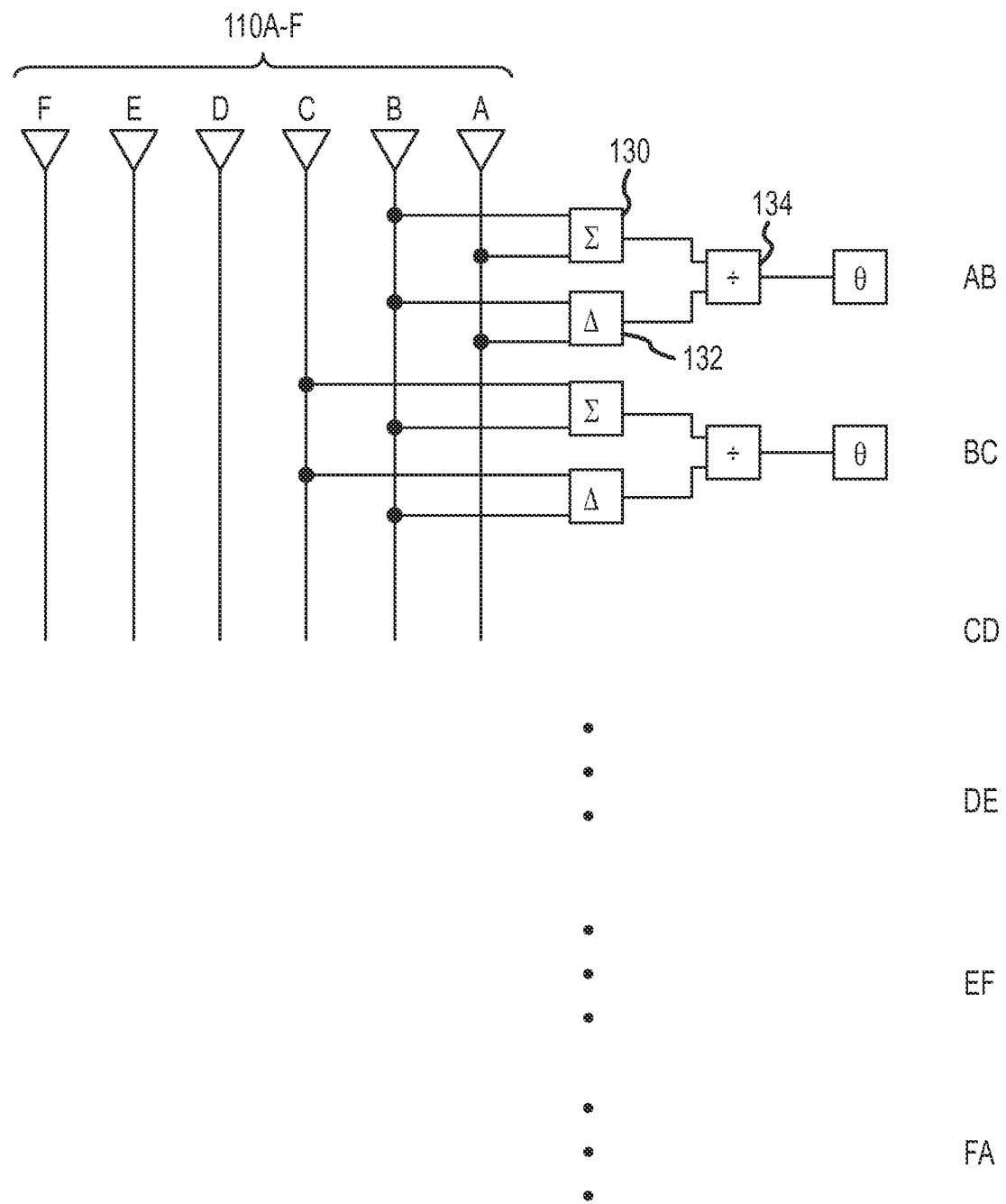
FIG. 2 Illustrates processing of adjacent antenna elements of the circular array antenna of FIG. 1 to determine angle of arrival information.

FIG. 2 broadly illustrates the overall process of utilizing signals from adjacent antennas to generate an angle of arrival value. Though illustrated for only the first and second pairs of adjacent antenna elements 110A-B and 110B-C, it will be appreciated that such processing functionalities perform for each of the antenna pairs. Likewise, the number of pairs may be increased or decreased depending on the total number of antenna elements disposed within the circular array. As illustrated in FIG. 2, initially the split signals from antenna elements A and B are received by a summation device 130 that calculates a sum of these signals. Likewise, a differencing device 132 calculates a difference for these signals. A ratio of these sums and differences is utilized to calculate an angle of arrival, as is further discussed below.

Figure 3:
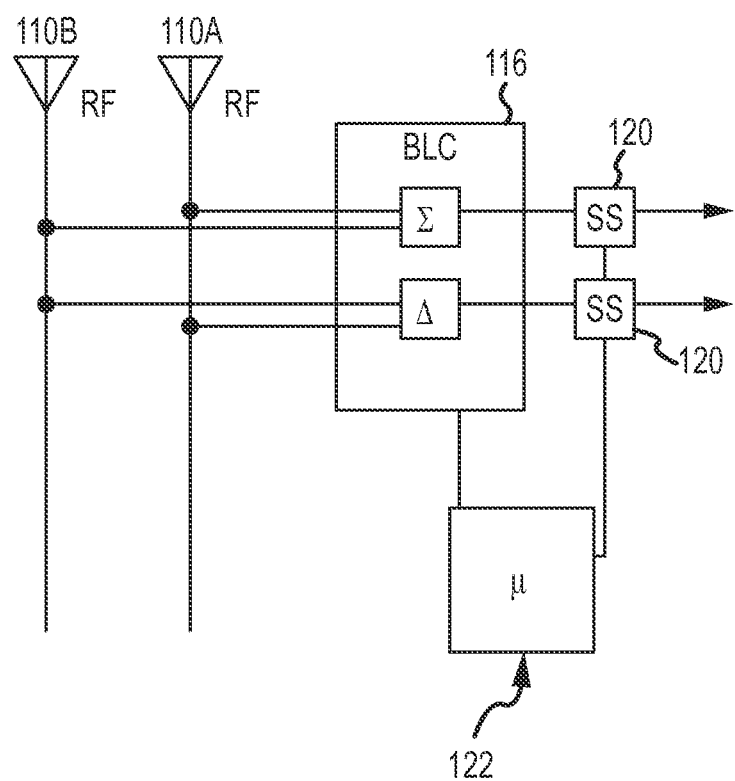
FIG. 3 illustrates generating a signal strength indication for adjacent antenna elements.

FIG. 3 illustrates the receipt of RF signals from first and second antenna elements 110A, 110B. The same process is performed for each pair of adjacent antenna elements. As will be appreciated, the antenna elements convert the propagating radio waves to RF signals. Furthermore, the summing and differencing functionality performed by the BLC 116 are also performed on RF signals. In the illustrated embodiment, the BLC is a passive component that operates free of the microprocessor. The output of the BLC 116 are RF signals that are received by the signal samplers 120 which receive the RF signal and generate a digital RSSI for use in calculating the AOA. As will be appreciated, the direct sampling of these signals requires no complex processing or adjustment of the signals to determine angle of arrival information.

Figure 4:
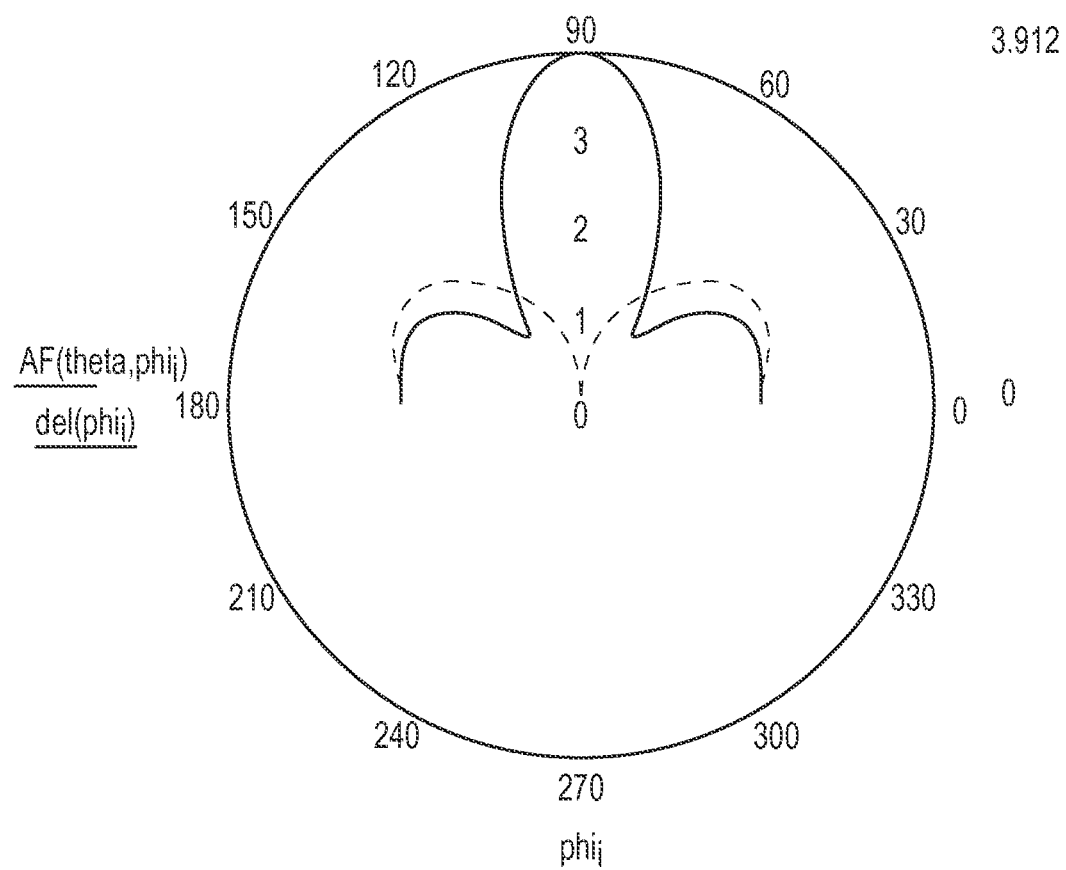
FIG. 4 illustrates a plot of sum and difference of signal strength indicators of adjacent antenna elements.

An exemplary plot of these sums and differences of one pair of antenna elements is presented as FIG. 4. Once the sum and difference of the signals of the adjacent antenna elements are calculated, a ratio 134 of these signals may be determined by the microprocessor. This ratio is related to an angle of arrival. Specifically, based on this ratio two possible angles of arrival can be determined by comparing the ratio of these measurements to a predetermined table or curve.

Figure 5:
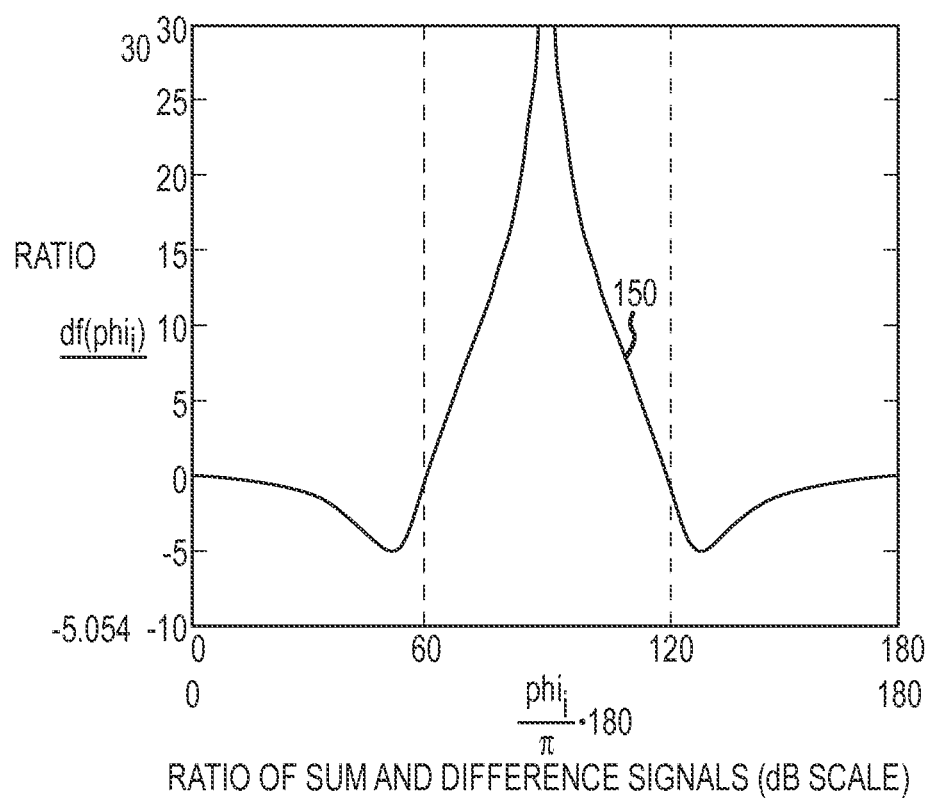
FIG. 5 illustrates an angle of arrival curve for an antenna element of a circular array antenna.

FIG. 5 illustrates the angle of arrival table/curve. As illustrated, FIG. 5 incldes a ratio scale on the y-axis and angle of arrival scale on the x-axis. An angle of arrival curve 150 is interposed within the graph. This angle of arrival curve 150 is a function of the design and spacing of the radius and number of antenna elements disposed within the array. Stated otherwise, differently configured antenna arrays will have different angular of the arrival curves 150. In the present instance, a center line axis of the angle of arrival curve along the x-axis represents a signal that arrives at an angle normal to a reference plane extending between adjacent antenna elements. Further, it will be appreciated that each set of antenna elements will include its own angle of arrival curve. While the angle of the arrival curve 150 will have the same shape for each set of antenna elements, these curves will be off-set from one another. For instance, in an antenna array utilizing six antenna elements, the resulting six angle of arrival curves 150 will be off-set 60° to each of their adjacent neighbors.

Figure 6:
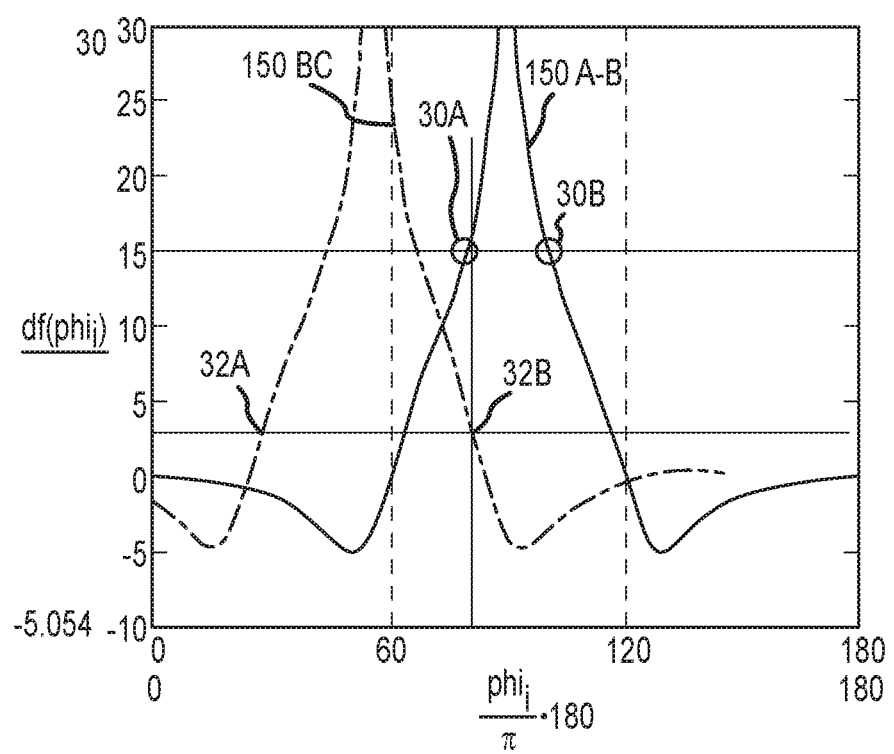
FIG. 6 illustrates utilization of two angle of arrival curves to confirm an angle of arrival measurement.

Referring to FIGS. 2 and 6, the ability to identify the ratio between the sum and differences allows for determining an angle of arrival in conjunction with the predetermined table/curve set forth in FIG. 5. By way of example only, if a ratio identified by the first set of adjacent elements A-B is 15, a line may be plotted across the angle of arrival curve 150A-B (or compared to a look-up table etc.) as illustrated in FIG. 6 to identify first and second possible angles of arrivals 30A, 30B where the ratio line (e.g., 15) crosses the angel of arrival curve 150A-B. As shown, the ratio line crosses the curve at two locations (i.e., two potential angles of arrival). The resolution of which of these first and second potential angles of arrivals correspond with the correct angle of arrival is resolved by looking at a similar measurement for at least a second pair of antenna elements. For instance elements B-C will have a different ratio (i.e., due to their offset from A-B), in the illustrated embodiment 2, that can likewise be applied to the angle of arrival curve 150B-C for elements B-C. Again, the second antenna pair B-C will identify first and second potential angles of arrival 32A, 32B. However, one of these angles of arrival (e.g., 32B) will correspond with one of the two angles (30A) identified by the first set of adjacent antenna elements A-B. Accordingly, this common angle of arrival (e.g., 75° on the x-axis) represents the true angle of arrival for the received signal. Optionally, signals from more than two antenna pairs can be measured (up to and including all adjacent pairs), the ratio computed, and these ratios may be compared to measurements from known angle of arrivals.

As will be appreciated, the presented system allows for determining an angle of arrival value by simply sampling the received signal strength indications (RSSI) of multiple adjacent antennas disposed in a circular array. Stated otherwise, no vector modulating schemes or other complex processing is required. In this regard, the antenna array 100 may be constructed of simplified off the shelf parts. The reduced computational complexity of the system alone and/or in conjunction with the ability to use off the shelf signal samplers permits the generation of a directional array in extremely economical manor. Specifically, in one embodiment the entire circuitry accepting the antenna elements and reflectors may be formed on a single planar circuit board.

Figure 7:
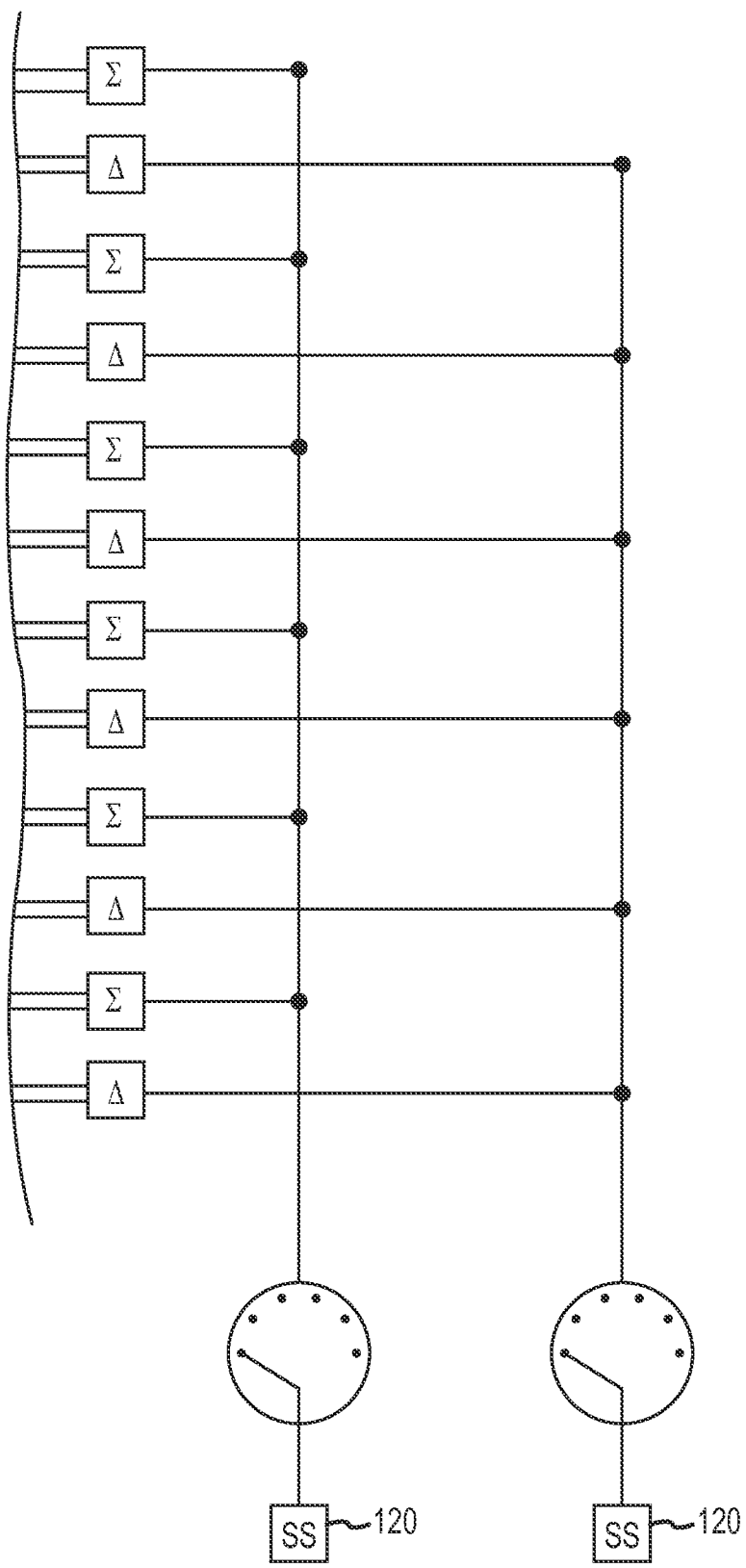
FIG. 7 illustrates processing of adjacent antenna elements utilizing a pole switch arrangement.

To further reduce the number of components and, thus, further reduce the cost of the system, a further embodiment utilizes a commutating switch or a single pole switch that allows for selectively sampling the sums and differences of the adjacent antenna pairs utilizing a single set of signal samplers. For instance, as set forth in FIG. 1, each set of poles includes first and second sets of signal samplers 120. Accordingly, a six element antenna array would require the use of twelve signal samplers thereby increasing the overall cost of the system. FIG. 7 illustrates an alternative embodiment that allows for utilizing first and second signal samplers with a plurality of different sets of adjacent antenna elements. In this regards, each commutating switch is interconnected to each of the summation devices 130 or difference devices 132 to selectively sample the same. Though illustrated in FIG. 7 is showing a single connection shared among each of the summation devices and delta devices, it will be appreciated that each switch is individually interconnected to each respective device. In operation, these switches are operated to sample the same sets of summations and differences and thereby enable sampling using the single pair of signal samplers.

The simplified angle of arrival system illustrated above may be utilized in various different embodiments. For instance, in one arrangement such a compact simplified directional array may be utilized as a mobile device itself. In this regard, the array may be mobile to identify the location of wireless devices. In such an arrangement, the mobile array 100 may be interconnected to an output device such as a display screen in order to provide an output indicative of the angle of arrival of an identified signal. In another arrangement, the simplified circular array antenna may provide for better monitoring of wireless networks. In this regard, organizations often desire to prevent unauthorized use of their wireless networks by users who are, for example, outside of a boundary of the organization. However, determining the location of such users has typically required two or more and especially in indoor situations, multiple directional arrays in order to calculate the location of a user. Accordingly, when the arrays are expensive the cost benefit of such wireless network enforcement may be prohibited. However, due to the inexpensive construction of the above-noted unit, the use of multiple units may be cost effective and allow for an organization to limit the use of their wireless network to a predefined area (e.g. within a building structure) and/or deny access to those located outside of such boundaries. While these two applications have been identified with specificity, it will be appreciated that the directional array system may be utilized in any application where it is desirable to identify the angle of arrival of a wireless signal and/or identify the location of the wireless device itself.

The invention claimed is:

1. A direction finding antenna system, comprising:
    a plurality of antenna elements disposed in a circular array, wherein each antenna element has equal angular spacing about the circular array and is equidistance from the center of the array and receives a wireless signal originating from a mobile wireless device;
    a plurality of signal splitters, one for each antenna element, wherein each said splitter splits an output signal from its respective antenna into two identical split signals;
    a plurality of branch line couplers, wherein each branch line coupler receives first and second split signals from an adjacent pair of said antenna elements and generates a sum of said split signals and a difference of said split signals for said adjacent pair of said antenna elements, respectively;
    signal samplers adapted to sample the output of said branch line couplers and generate a signal strength indication; and
    a processor adapted to utilize the signal strength indication from said signal samplers to:
        calculate a first ratio of the sum of said split signals and the difference of said split signals for a first pair of adjacent antenna elements and identify first and second potential angles of arrival for said wireless signal by comparing said first ratio with stored information for said first pair of adjacent antenna elements;
        calculate a second ratio of the sum of said split signals and the difference of said split signals for a second pair of adjacent antenna elements, different that said first pair of adjacent antenna elements, and identify third and fourth potential angles of arrival for said wireless signal by comparing said second ratio with stored information for said second pair of adjacent antenna elements; and determine an angle of arrival for said wireless signal by correlating one of said first and second potential angles of arrival with one of said third and fourth potential angles of arrival.

2. The antenna of claim 1, wherein said first pair of adjacent antenna elements and said second pair of adjacent antenna elements have a common antenna element.

3. The antenna of claim 1, wherein said signal samplers generate an RSSI value.

4. The antenna of claim 3, wherein said signal samplers receive an RF signal and generate a digital output.

5. The antenna of claim 1, wherein said stored information comprises at least one of:

a look up table specific to a configuration of said circular array;

a curve or equation specific to a configuration of said circular array.

6. The antenna of claim 1, further comprising, a first commutating switch interconnecting a plurality of said branch line couplers that sum said signals to generate sum signals; and a second commutating switch connecting a plurality of branch line couplers that difference said signals to generate difference signals, wherein a single signal sampler samples all said sum signals for all adjacent antenna pairs and a single signal sampler samples all said difference signals for all adjacent antenna pairs.

7. The antenna of claim 1, wherein said signal splitters, branch line couplers, signal samplers and processor are fabricated on a single circuit board.

* * * * *